(12) United States Patent
Forden et al.

(10) Patent No.: US 12,367,181 B2
(45) Date of Patent: *Jul. 22, 2025

(54) OPERATIONS AND MAINTENANCE FILE PROTECTION PROCESSES

(71) Applicant: Innovative Process Technologies, LLC, Peoria, AZ (US)

(72) Inventors: Holly Marie Forden, Peoria, AZ (US); Christopher Alan Bresciani, Phoenix, AZ (US); Laura Lee Allen, Surprise, AZ (US); Thomas Lloyd Fitzgerald, IV, Phoenix, AZ (US)

(73) Assignee: INNOVATIVE PROCESS TECHNOLOGIES, LLC, Peoria, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,052

(22) Filed: Nov. 13, 2023

(65) Prior Publication Data
US 2024/0078214 A1 Mar. 7, 2024

Related U.S. Application Data

(63) Continuation-in-part of application No. 17/530,531, filed on Nov. 19, 2021, now Pat. No. 11,816,071, which is a continuation-in-part of application No. 16/036,898, filed on Jul. 16, 2018, now Pat. No. 11,288,228.

(60) Provisional application No. 62/532,703, filed on Jul. 14, 2017, provisional application No. 62/645,084, filed on Mar. 19, 2018.

(51) Int. Cl.
*G06F 16/176* (2019.01)
*G06F 16/16* (2019.01)

(52) U.S. Cl.
CPC ........ *G06F 16/1767* (2019.01); *G06F 16/166* (2019.01)

(58) Field of Classification Search
None
See application file for complete search history.

(56) References Cited

U.S. PATENT DOCUMENTS

| 5,138,697 | A | * | 8/1992 | Yamamoto | G06F 30/00 345/441 |
| 6,721,769 | B1 | * | 4/2004 | Rappaport | G06F 30/13 455/39 |
| 2010/0251028 | A1 | * | 9/2010 | Reghetti | G06F 30/13 714/39 |

* cited by examiner

Primary Examiner — Giuseppi Giuliani
(74) Attorney, Agent, or Firm — Todd A. Serbin; Maynard Nexsen PC

(57) ABSTRACT

Operations and Maintenance Design drawing maintenance, As-Built drawing conformance, and Record drawing conformance processes for protecting the integrity of dynamically modified files for Brownfield Assets through all phases of a drawing's lifecycle.

20 Claims, 23 Drawing Sheets

☐ INDICATES WORKFLOW

STEP 9

In the New Design Construction Sheet File grayscale all the existing condition layers found in the new Demolition Construction sheet File that is externally referenced into model space.

Place all new design in model space on the appropriate corresponding layers that match identical layer names of the New Demolition Construction Sheet File. These layers will designate new work added to the file. Place all key notes/construction notes, revision clouds and call out leaders on the appropriate layers in paper space.

STEP 10

Prior to publication for release of the New Demolition Construction Sheet File and the New Design Construction Sheet File, perform the following steps to ensure all information found within the Record Drawing File is maintained as the current version within the New Demolition Construction Sheet File. The New Design Construction Sheet file will reflect the latest existing conditions when opened or published after updates have occurred to the new Demolition Construction Sheet File.

Using Artificial Intelligence and Machine Learning or Drawing Database Comparison tools to perform spatial analysis (within a CAD software, Document Management System Software or Cloud Computing Service). In model space of the New Demolition Construction Sheet File, delete all layers with exception to the Demolition and Correctives layers. Search the Record Drawing File and query all layers into the file.

Using Artificial Intelligence and Machine Learning or Drawing Database Comparison tools to perform spatial analysis to search for duplicate geometries, dimensions and text and delete duplicated information retaining the Demo and Correctives Layers. Check and resolve any design conflicts. Save the file.

Update all Revision Blocks for release.
Save the file, upon approval publish for release for construction.

FIG. 2 (Continued Workflow from FIG. 1)

Step 1. Download or Copy Record Drawing Files From Remote Database, Document Management System, Cloud Computing Service or File Repository

*(This Step Is Performed Internal of O&M Organization)*

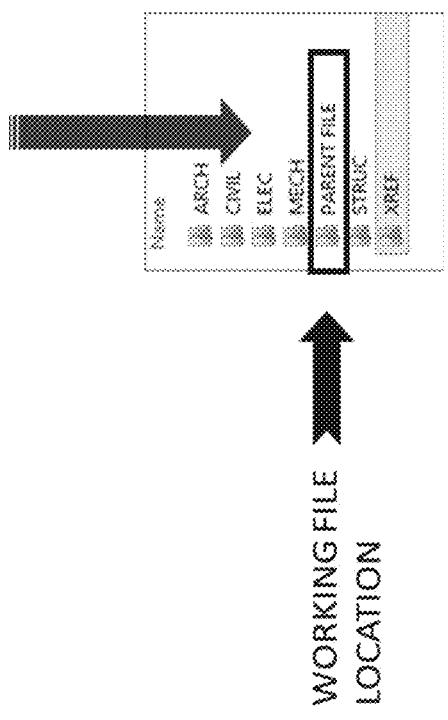

Project Preliminary Design Files: Record Drawing File.dwg(s) are downloaded from Remote Database, Document Management System, Cloud Computing Service or File Repository to the Project Parent File Folder

FIG. 3

Step 10. Using Artificial Intelligence and Machine Learning or Drawing Database Comparison tools perform spatial analysis to Update the Model Space Content Of The New Demolition Construction Sheet File. Delete All Layers In Model Space Of The New Demolition Construction File With Exception To The Demo And Correctives Layers – Query In All Layers From The Record Drawing File Model Space. Delete duplicated geometries, dimensions and text Retaining The Demo And Correctives Layers

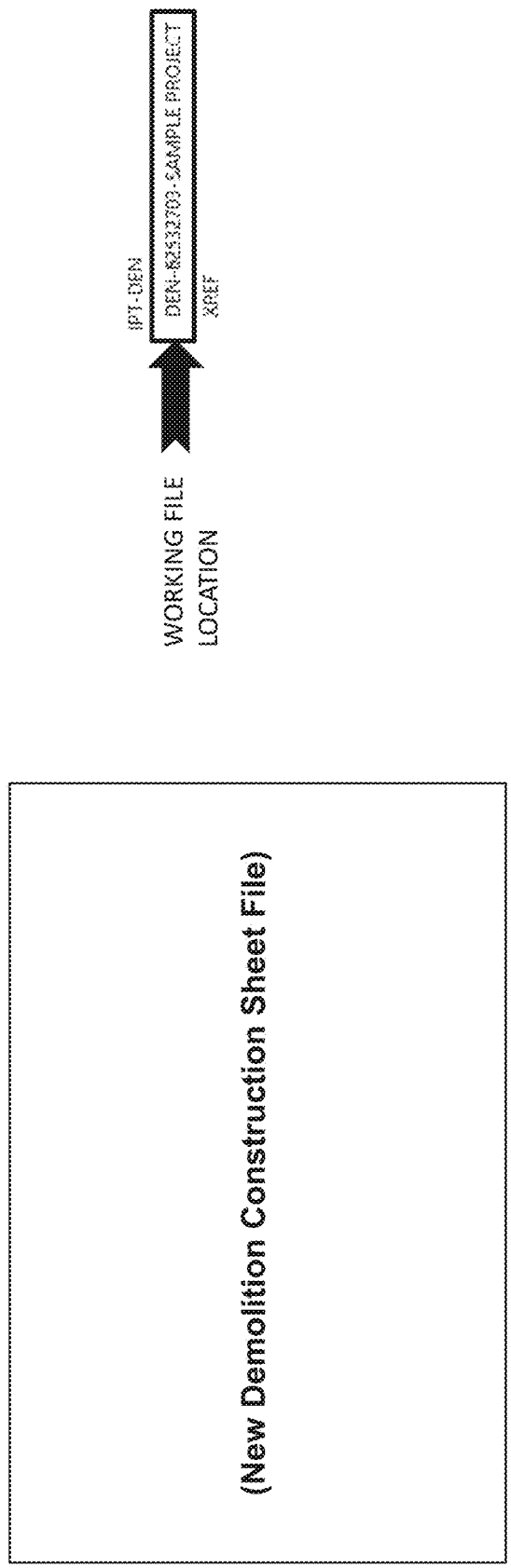

(New Demolition Construction Sheet File)

FIG. 14

Step 3. Upon Approval – Reindex or release in the Remote Database, DMS, CSS or File Repository the Record Drawing File for release as the next historical record.

OPERATIONS AND MAINTENANCE FILE PROTECTION PROCESSES

RELATED APPLICATIONS

This application is a continuation in part of and claims the benefit of priority under 35 U.S.C. § 120 to U.S. patent application Ser. No. 17/530,531 filed Nov. 19, 2021, which is a continuation in part of U.S. patent application Ser. No. 16/036,898 filed Jul. 16, 2018, now issued as U.S. Pat. No. 11,288,228, which claimed the benefit of priority under 35 U.S.C. § 119(e) of U.S. Patent Application No. 62/532,703 filed Jul. 14, 2017 and U.S. Patent Application No. 62/645,084 filed Mar. 19, 2018, the contents of which are incorporated herein by reference in their entireties.

FIELD AND BACKGROUND OF THE INVENTION

The present invention, in some embodiments thereof, relates to information technology and, more particularly, but not exclusively, to enhancement and optimization of tasks using information technology.

SUMMARY OF THE INVENTION

There is provided in accordance with an aspect of the invention, an operations and maintenance enhanced design drawing conformance process for protecting the integrity of dynamically modified files (Brownfield Assets), comprising: downloading or copying a Record Drawing File (2D, 3D model or Digital Twin file) from a Remote Database, Document Management System (DMS), Cloud Computing Service (CCS), or File Repository; conforming the Record Drawing File (2D, 3D model or Digital Twin file) for CADD standards for proper model space and paper space usage; reindexing the conformed Record Drawing File (2D, 3D model or Digital Twin file) into the Remote Database, DMS, CCS, or File Repository; renaming the conformed downloaded or copied Record Drawing File (2D, 3D model or Digital Twin file) matching the Record Drawing File Name and with a Unique Project Identifier suffix with an additional designator suffix to distinguish that this document is for demolition purposes, known as the new Demolition Construction Sheet File, which allows a user to discern that removal edits to an existing Record Drawing File (2D, 3D model or Digital Twin file) is required and which also prevents overwrite of data by concurrent changes occurring to the same Record Drawing File (2D, 3D model or Digital Twin file); creating a Demolition Layer that includes demolition objects to be removed in the new Demolition Construction Sheet File; creating a Correctives Layer that includes existing conditions that require drawing correctives for content or location in the new Demolition Construction Sheet File; changing demolition objects to the Demolition Layer within the new Demolition Construction Sheet File. This file will be plotted and distributed for construction activities; creating a new Design Construction Sheet File by importing the paper space layout of the new Demolition Construction Sheet File and saving the file with the naming conventions that matches the Record Drawing File Name and with a new Unique Project Identifier suffix without any additional designator suffix to distinguish that this document is for design purposes, which allows a user to discern that addition edits to an existing Record Drawing File (2D, 3D model or Digital Twin file) is required and which also prevents overwrite of data by concurrent changes occurring to the same Record Drawing File (2D, 3D model or Digital Twin file); and, externally referencing (XREF) into the model space of the new Design Construction Sheet File, the new Demolition Construction Sheet File. Freezing the Demolition layer and Correctives layer of the externally referenced new Demolition Construction Sheet File to remove their visibility within the file. This file will be plotted and distributed for construction activities.

In an embodiment of the invention, downloading is from a Remote Database, DMS, CCS, or File Repository.

In an embodiment of the invention, conforming includes validating and applying Layer standards, validating Borders as externally referenced entities, inserting Border Informational Text into a paper space layout to allow for variable information to be managed and maintained, allowing for mapped values (meta data) into the Remote Database, DMS, CCS, or File Repository, and moving historical text, dimensions and notes found in paper space into model space to their correct spatial locations and applying an appropriate scale factor to this information to ensure legibility and that all historical data can be correctly used within the process.

In an embodiment of the invention, conforming includes re-indexing the conformed Record Drawing File (2D, 3D model or Digital Twin file) into the Remote Database, DMS or CCS, or File Repository prior to the creation of the new Demolition Construction Sheet File to ensure that all drawing historical data, now in model space, is saved, available and can be correctly used within the process.

In an embodiment of the invention, renaming matching the Record Drawing File Name and with a Unique Project Identifier suffix with an additional designator suffix to distinguish that this document is for demolition purposes, known as the new Demolition Construction Sheet File which allows a user to discern that removal edits to an existing Record Drawing File (2D, 3D model or Digital Twin file) is required, while also preventing overwrite of data by concurrent changes occurring to other copies of the same Record Drawing File (2D, 3D model or Digital Twin file) by other files with another Unique Project Identifier Numbers suffix.

In an embodiment of the invention, the process further comprises saving the new Demolition Construction Sheet File in a separate directory designated for Project Files used for file compositions in the new Demolition Construction Sheet File and new Design Construction Sheet File.

In an embodiment of the invention, the process further comprises making sure that the origins of both the Record Drawing File (2D, 3D model or Digital Twin file) and the new Demolition Construction Sheet File are in the same spatial location and using the overlay method externally referencing in the new Demolition Construction Sheet File into the model space of the new Design Construction Sheet File.

In an embodiment of the invention, creating the new Design Construction Sheet File further comprises freezing the Demolition layer and Correctives layer to remove their visibility within the file.

In an embodiment of the invention, creating the new Design Construction Sheet File further comprises saving the file in a separate directory designated for Project Files.

In an embodiment of the invention, creating the new Design Construction Sheet File further comprises placing all new items to be added during the construction project on the appropriate discipline specific layers, wherein all layer names used in the Record Drawing File (2D, 3D model or Digital Twin file), new Demolition Construction Sheet File, and the new Design Construction Sheet File should be exactly the same in naming convention with the entity properties set to by layer.

In an embodiment of the invention, the process further comprises creating a layer named CORRECTIVES in the new Demolition Construction Sheet File.

In an embodiment of the invention, the process further comprises correcting items in the new Demolition Construction Sheet File and moving them to the new Design Construction Sheet File by way of the Correctives layer.

In an embodiment of the invention, the process further comprises deleting items in the new Demolition Construction Sheet File.

In an embodiment of the invention, creating the new Demolition Construction Sheet File includes freezing the Correctives layer if it is being used to remove an existing condition and placing notes and call out leaders on the appropriate layers in paper space.

In an embodiment of the invention, creating the new Design Construction Sheet File includes freezing the Demolition layer and Correctives layer to remove their visibility within the file.

In an embodiment of the invention, creating the new Design Construction Sheet File includes externally referencing the new Demolition Construction Sheet File into the model space of the new Design Construction Sheet File and placing notes and call out leaders on the appropriate layers in paper space, as these notes relate to construction activities only and will not be retained as historical information for incorporation into the Record Drawing File (2D, 3D model or Digital Twin file).

In an embodiment of the invention, colors are used to differentiate at least one of the layers, files, and operations to be performed.

In an embodiment of the invention, the process further comprises: conforming the new Demolition Construction Sheet File for As-built including making revisions to the new Demolition Construction Sheet File in both model space and paper space for any field revisions that occurred during construction activities; downloading or copying a Record Drawing File (2D, 3D model or Digital Twin file) from a Remote Database, DMS, CCS, or File Repository to a working location; deleting all layers in model space of the new Demolition Construction Sheet File with exception of the Demolition layer and Correctives layer and performing spatial analysis of the Record Drawing File (2D, 3D model or Digital Twin file) with the use of Artificial Intelligence and Machine Learning or Database Comparison Tools to import all layers found in the model space of the Record Drawing File into the model space of the new Demolition Construction Sheet File; Using Artificial Intelligence and Machine Learning or Database Comparison Tools to spatially locate and validate duplicated items that will be deleted, comparing between the imported content of the Record Drawing File and the Demolition layer and Correctives layer of the New Demolition File, then removing these duplicated items that were imported from the Record Drawing File within the new Demolition Construction Sheet File while retaining all objects found on the Demolition layer and the Corrective layer within the new Demolition Construction Sheet File; conforming the new Design Construction Sheet File for As-built including making revisions to the new Design Construction Sheet File in both model space and paper space, if necessary, for any field revisions that occurred during construction activities; updating the Revision Block in the new Demolition Construction Sheet File and updating the Revision Block in the new Design Construction Sheet File; and, routing conformed As-Built drawings, comprising the new Demolition Construction Sheet File and new Design Construction Sheet File, for approval to apply the changes to the latest historical Record Drawing File (2D, 3D model or Digital Twin file).

There is further provided in accordance with an aspect of the invention, an operations and maintenance record drawing conformance process for updating Construction Drawings prior to release for Construction, and protecting the integrity of dynamically modified files, comprising: downloading or copying a Record Drawing File (2D, 3D model or Digital Twin file) from Remote Database, DMS, CCS, or File Repository to a working location; deleting all layers in model space of the new Demolition Construction File with exception of the Demolition layer and Correctives layer and with the use of Artificial Intelligence and Machine Learning or Database Comparison Tools to perform spatial analysis of the Record Drawing File (2D, 3D model or Digital Twin file) to import all layers found in model space into the new Demolition Construction Sheet File. Using Artificial Intelligence and Machine Learning or Database Comparison Tools to spatially locate and validate duplicated items that will be deleted, comparing between the imported content of the Record Drawing File and the Demolition layer and Correctives layer of the New Demolition File, then removing these duplicated items that were imported from the Record Drawing File within the new Demolition Construction Sheet File while retaining all objects found on the Demolition layer and the Corrective layer within the new Demolition Construction Sheet File.

There is further provided in accordance with an aspect of the invention, an operations and maintenance record drawing conformance process for protecting the integrity of dynamically modified files (2D, 3D model or Digital Twin file) Brownfield Assets, comprising: downloading or copying a Record Drawing File (2D, 3D model or Digital Twin file) from a Remote Database, DMS, CCS, CAD Software, or File Repository to a working location; Comparing the Demolition layer and a Correctives layer from the new Demolition Construction Sheet File with the use of Artificial Intelligence and Machine Learning or Database Comparison Tools to perform spatial analysis to identify and delete duplicated geometries, dimensions and text from the Record Drawing File (2D, 3D model or Digital Twin file) objects that appear on the Demolition layer and the Correctives layer from the new Demolition Construction sheet File; Using Artificial Intelligence and Machine Learning or Database Comparison Tools to perform spatial analysis, to query the new Design Construction Sheet File and import all new Design Construction Sheet File layers found in model space into the Record Drawing File (2D, 3D model or Digital Twin file) adjusting all entity colors to BYLAYER upon import; and, plotting Record Drawing File and routing the plotted Updated Record Drawing File (2D, 3D model or Digital Twin file) for approval prior to indexing the Record Drawing File (updated next historical release of a 2D, 3D model or Digital Twin file) into the Remote Database, DMS, CCS, CAD Software, or File Repository.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided. A display and/or a user input device such as a keyboard or mouse are optionally provided.

BRIEF DESCRIPTION OF THE SEVERAL VIEWS OF THE DRAWING(S)

Some embodiments of the invention are herein described, by way of example only, with reference to the accompanying drawings and images. With specific reference now to the drawings and images in detail, it is stressed that the particulars shown are by way of example, are not necessarily to scale, and are for purposes of illustrative discussion of embodiments of the invention. In this regard, the description taken with the drawings makes apparent to those skilled in the art how embodiments of the invention may be practiced.

In the drawings:

FIG. 1-2 is a flowchart showing an exemplary Operations and Maintenance Design Drawing Conformance Process, in an aspect;

FIGS. 3-15 show exemplary and/or alternative actions performable with an Operations and Maintenance Design Drawing Conformance Process, in an aspect;

DESCRIPTION OF SPECIFIC EMBODIMENTS OF THE INVENTION

Figure 1:
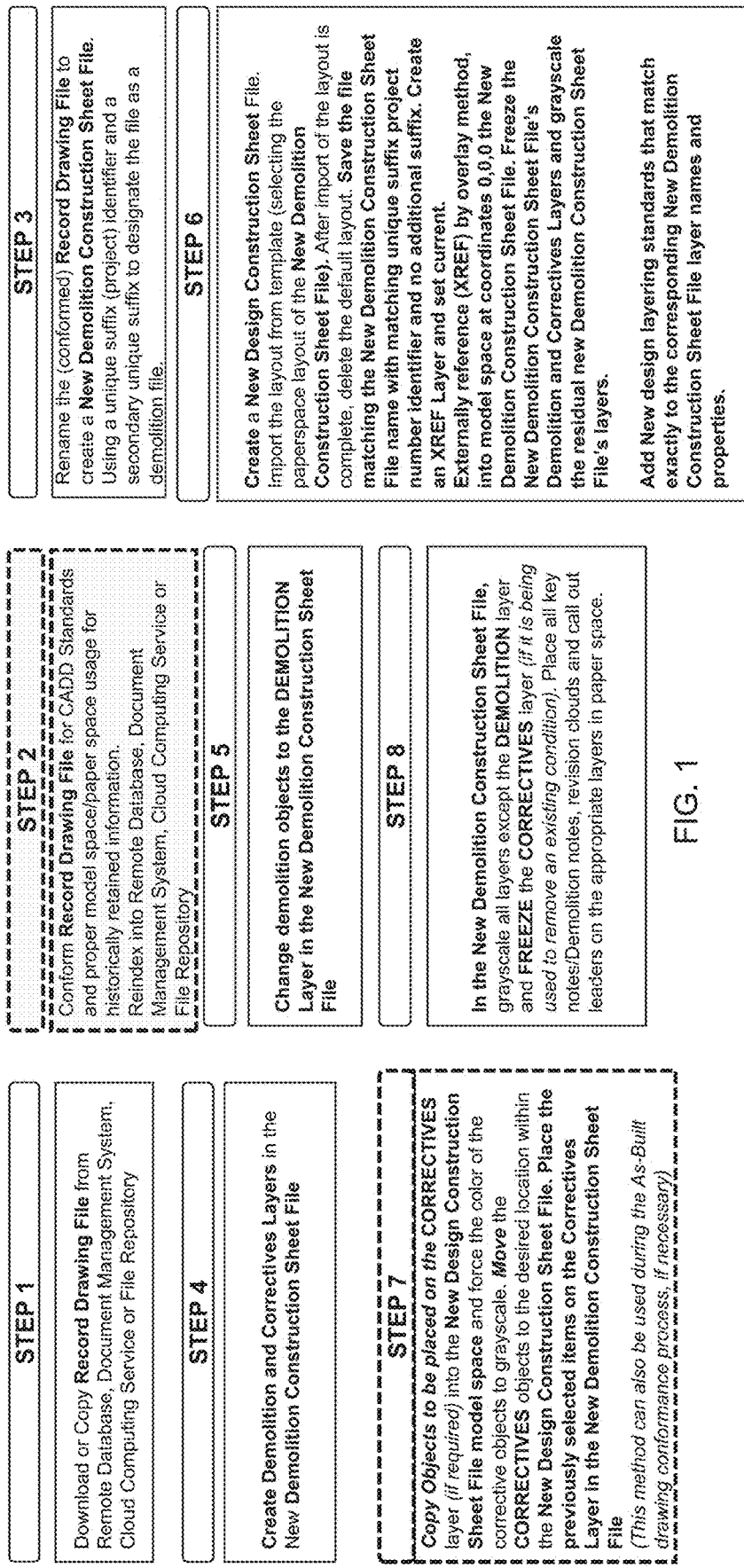

The present invention, in some embodiments thereof, relates to information technology and, more particularly, but not exclusively, to enhancement and optimization of tasks using information technology.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Generally, without competent drawing content management policies and procedures in place, operations, asset, and risk management, which require exceptional management and operational focus to succeed, become even more daunting challenges, most especially in the utility and facility management industries worldwide.

Utility and facility organizations are often faced with the challenge of working with dynamically changing computer aided drafting and design (CAD) files during the DESIGN, AS-BUILT and RECORD process of Operations and Maintenance ("O&M") utility or facilities upgrades of Brownfield Assets. Complicating the issue further, it is not unreasonable for this problem to be exacerbated by multiple concurrent Designs, As-Builts or Record drawing updates utilizing the same Record Drawing File (2D, 3D model or Digital Twin file) of Brownfield Assets. It should be understood that the processes described herein are intended to enable utility and facility maintenance industries worldwide to efficiently and effectively manage and maintain these dynamically changing O&M record drawings of Brownfield Assets. For example, the processes described herein reduce and/or eliminate the possible loss and/or overwrite of data that may occur while trying to update and maintain dynamically changing Record Drawing Files (2D, 3D model or Digital Twin file) of Brownfield Assets.

While the following process examples utilize Autodesk® software, it can be incorporated for use in any commercially available Remote Database, DMS, CCS, File Repository or CAD Software application currently, or in the future, that use Artificial Intelligence and Machine Learning or Database Comparison Tools for sale in the engineering industry.

The following defined terms are used throughout this description:

As-Built: A term used to describe the approved final construction conditions of a project.

Block: Multiple CAD drawing entities combined into one group.

Conformed Record Drawing File: a copy and renamed Record Drawing File (2D, 3D model or Digital Twin file) of Brownfield Assets. that has been conformed to meet proper layering standards, organizational CAD standards, and model space and paper space usage. In essence, it is a "snap shot in time" used to convey existing conditions, demolition and correctives that occur during the design and construction phases of a project.

COPYBASE: A CAD command to copy objects from a known base point coordinate determined by the Editor. For example, 0,0.

Demolition Construction Sheet File: CAD drawing file Construction Contract Document used to show demolition items.

Design File: CAD drawing file that reflects a new design.

Design Construction Sheet File: CAD drawing file Construction Contract Document used to show new design items.

Externally Referencing: A method of file composition where one CAD drawing file is designated to be overlaid (externally referenced) into another CAD drawing file. Paper space items in the XREF files are ignored and model space items are viewable/printable.

Record Drawing File: A recorded CAD drawing file document of a Brownfield Asset, whether an existing 2D, 3D model or Digital Twin File, that retains historical information for every approved As-Built Revision change that has occurred since its first record drawing release.

Revision Block: A textual annotation block that is updated with every release of a document describing the Reason for Document Change, Revision Letter or Number and date of Approval for Official Release.

XREF: A designation for a file that will be used for externally referencing one CADD drawing file into another CAD drawing file. For example, the new Demolition Construction Sheet File will be externally referenced into the Design Construction Sheet File.

Artificial Intelligence: The general ability of a computer to emulate human thought and perform complex tasks, such as analyzing, in real-world environments.

Machine Learning: A subset of Artificial Intelligence that uses technologies and algorithms that enables systems to identify patterns, make decisions, and improve themselves through experience and data.

Brownfield Asset: An existing facility system or component thereof that will be maintained, modified, expanded, redeveloped, reused or replaced.

Spatial Analysis: The process of examining, assessing, evaluating, and comparing spatial data features such as locations, attributes, and relationships that reveal the geometric or geographic properties of data.

Digital Twin File: A virtual 3D model or 2D CAD drawing of a real-world physical product, system or process that serves as the effectively indistinguishable digital counterpart of it for practical purposes, such as simulation, integration, testing, monitoring, and maintenance.

Referring now to the drawings, FIGS. 1 and 2 is a schematic flowchart showing an exemplary O&M Design Drawing Conformance Process for protecting the integrity of dynamically modified files of Brownfield Assets, in an aspect. Exemplary actions taken are described in more detail with respect to FIGS. 3-12, below.

FIG. 3 shows a detailed screenshot view of performing a Step 1—Download or copy the Record Drawing File (2D, 3D model or Digital Twin file) of a Brownfield Asset from Remote Database. DMS, CCS or File Repository (if applicable).

Figure 4:
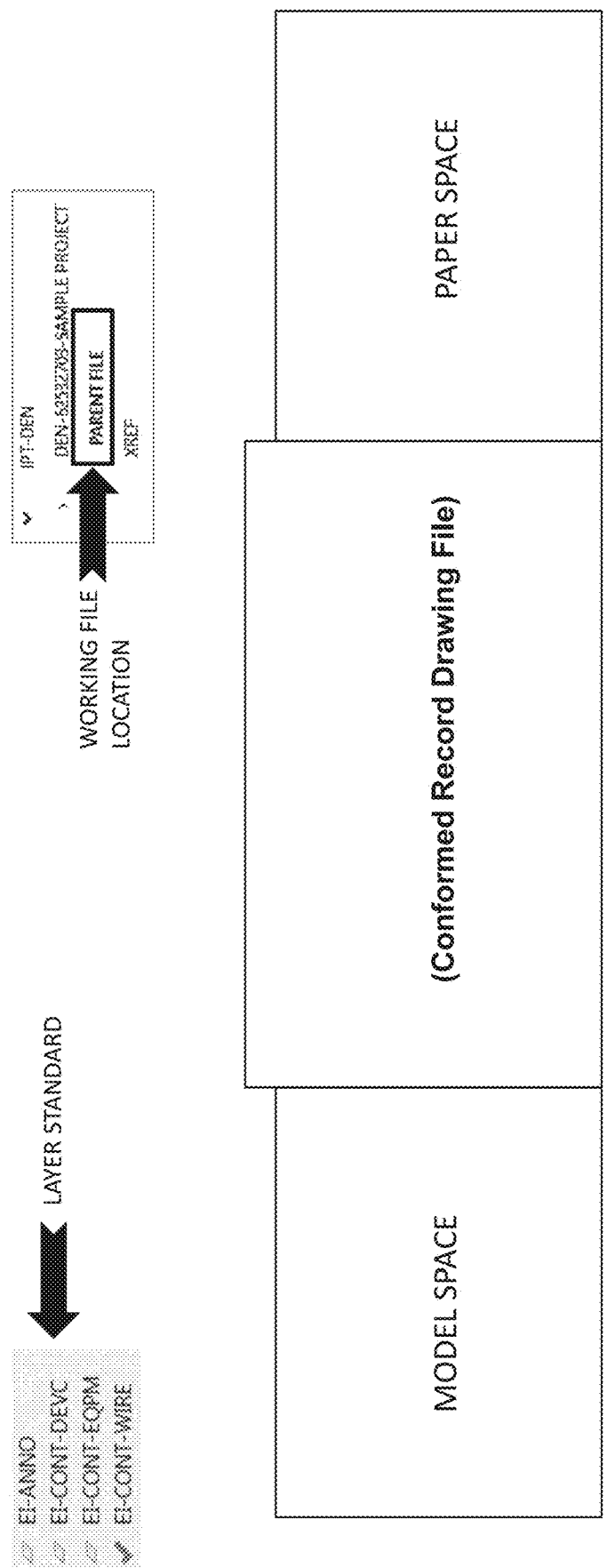

FIG. 4 shows a detailed screenshot view of performing a Step 2—Conformance of the Record Drawing File (2D, 3D model or Digital Twin file) of a Brownfield Asset will consist of converting recorded historical information potentially located in paper space that will be displayed throughout the Design process to model space. Layer standards will also be validated and applied. Borders will be validated as externally referenced entities (non-Variable linework for the O&M Organization) and Border Informational Text will be inserted into the paper space layout to allow for Variable information to be managed and maintained (allowing for mapped values as meta data into a Remote Database, DMS, CCS, or File Repository). This completed conformed drawing should be immediately re-indexed into the Remote Database, DMS, CCS, or File Repository if this step is required of the file.

Figure 5:
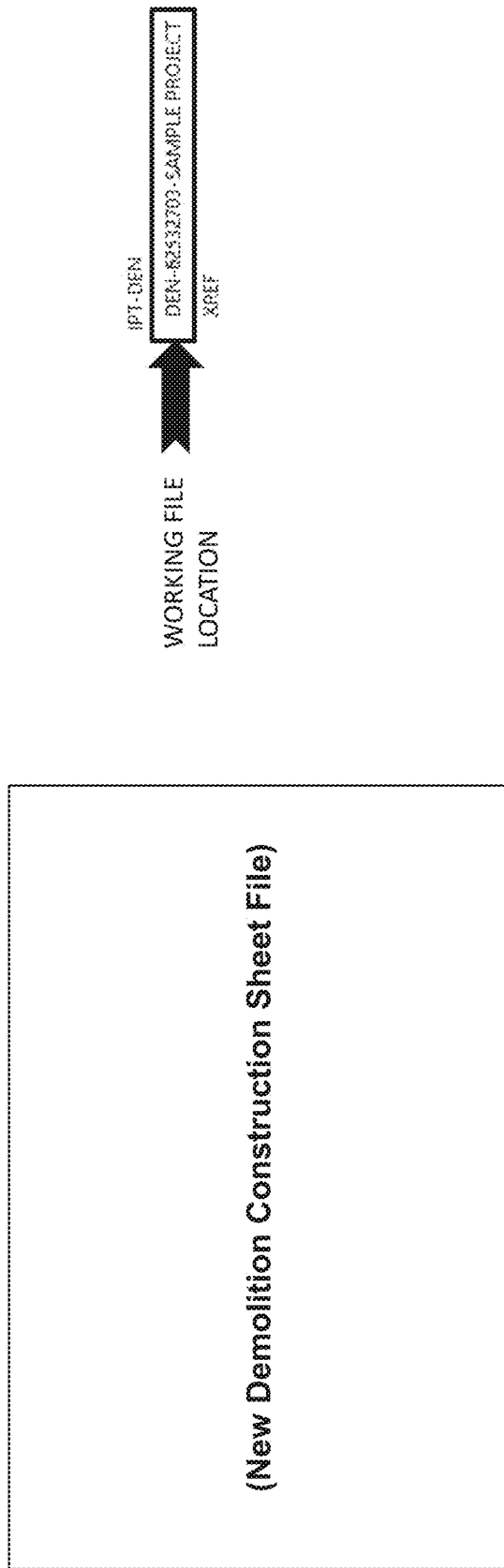

FIG. 5 shows a detailed screenshot view of performing a Step 3—Rename the completed conformed Record Drawing File (2D, 3D model or Digital Twin file) of a Brownfield Asset to create a new Demolition Construction Sheet File. Using a unique suffix (project) identifier and a secondary unique suffix to designate the file as a demolition file. This Unique Identifier will allow the organization to discern that an edit (items to be removed) to an existing Record Drawing File (2D, 3D model or Digital Twin file) of a Brownfield Asset will be required in the O&M Record Drawing File Conformance Process and also prevent overwrite of data by concurrent changes occurring to the same Record Drawing File (2D, 3D model or Digital Twin file) of a Brownfield Asset. This new file will be referred to as the new Demolition Construction Sheet File in some embodiments of this process. Save this file in a separate directory designated for Project Files used for file compositions in the Demolition and Design Construction Sheet Files.

Figure 6:
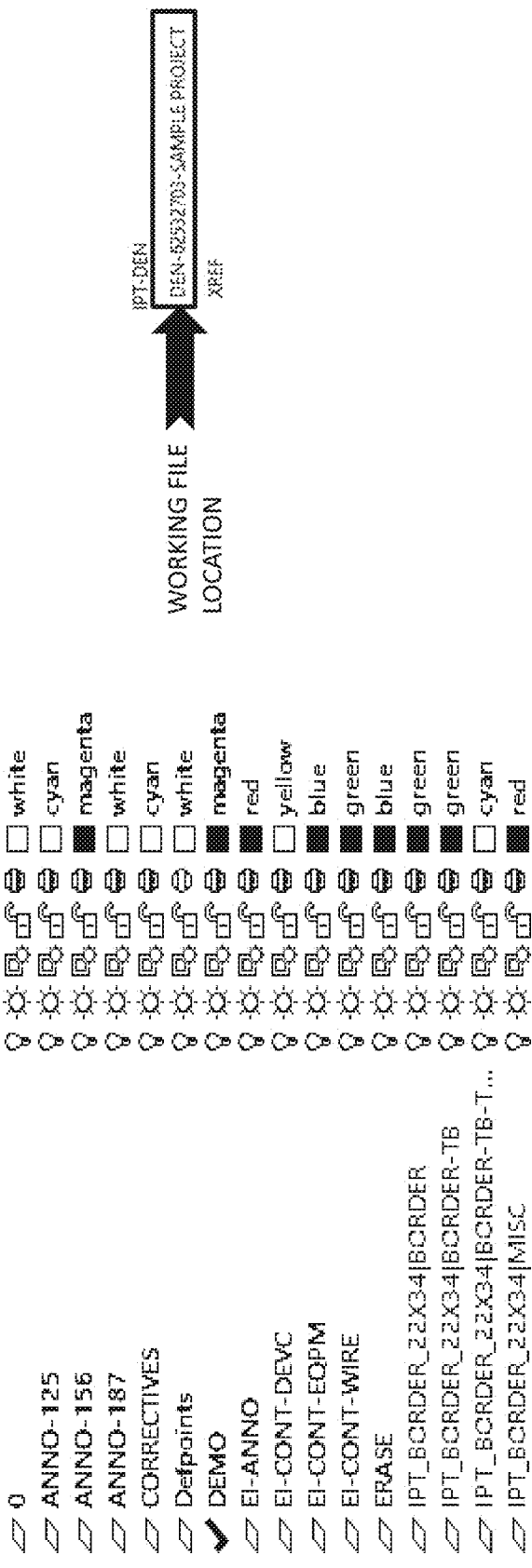

FIG. 6 shows a detailed screenshot view of performing a Step 4—Create a layer (DEMOLITION) that will represent the demolition or items to be removed during construction activities in the new Demolition Construction Sheet File and set to a color that will be specific for items to be removed. Also, create a layer (CORRECTIVES) that will represent existing conditions that require drawing correctives for content or location in the new Demolition Construction Sheet File and set to a color that will be specific for items to be relocated or corrected. This layer may need to be used when moving or making correctives to existing condition items in the new Design Construction Sheet File as described in Alternative Workflow for Moving or Deleting Existing Items beginning at Step 7 (if required).

Figure 7:
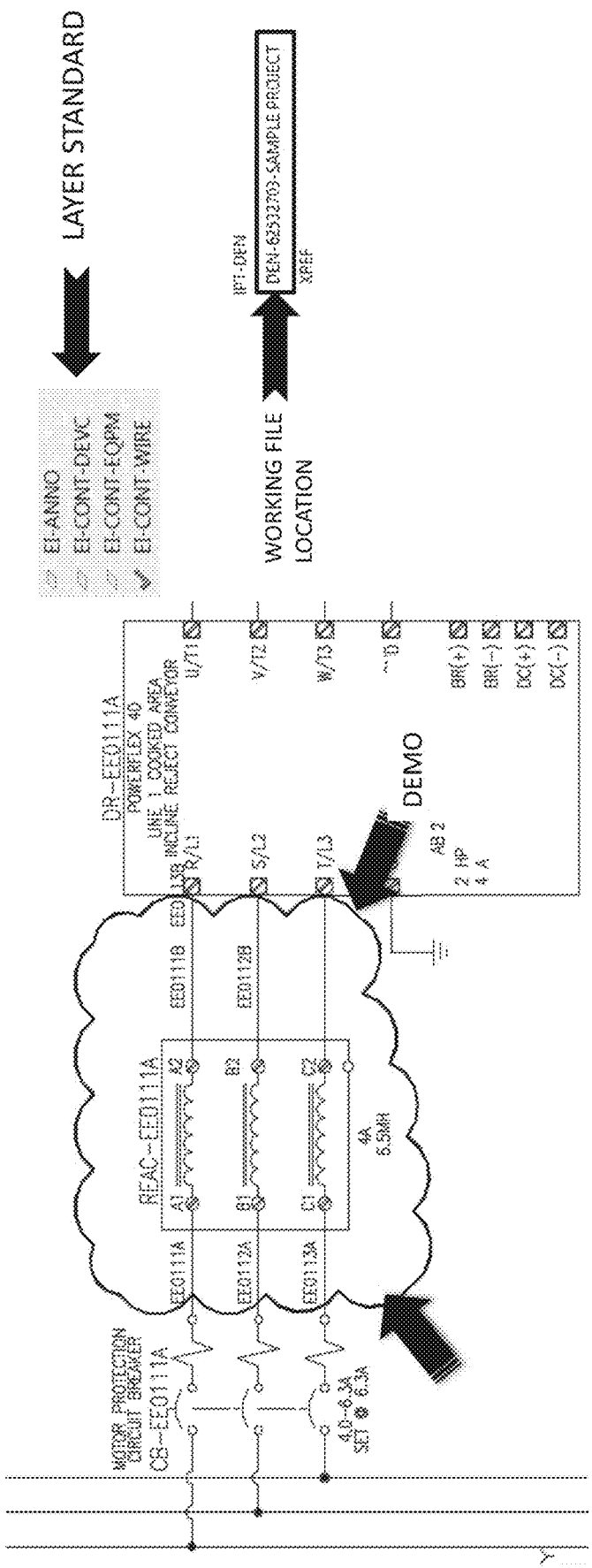

FIG. 7 shows a detailed screenshot view of performing a Step 5—Change demolition objects to the DEMOLITION layer within the new Demolition Construction Sheet File. The demolition objects are the items to be removed during the construction of the new design.

Figure 8:
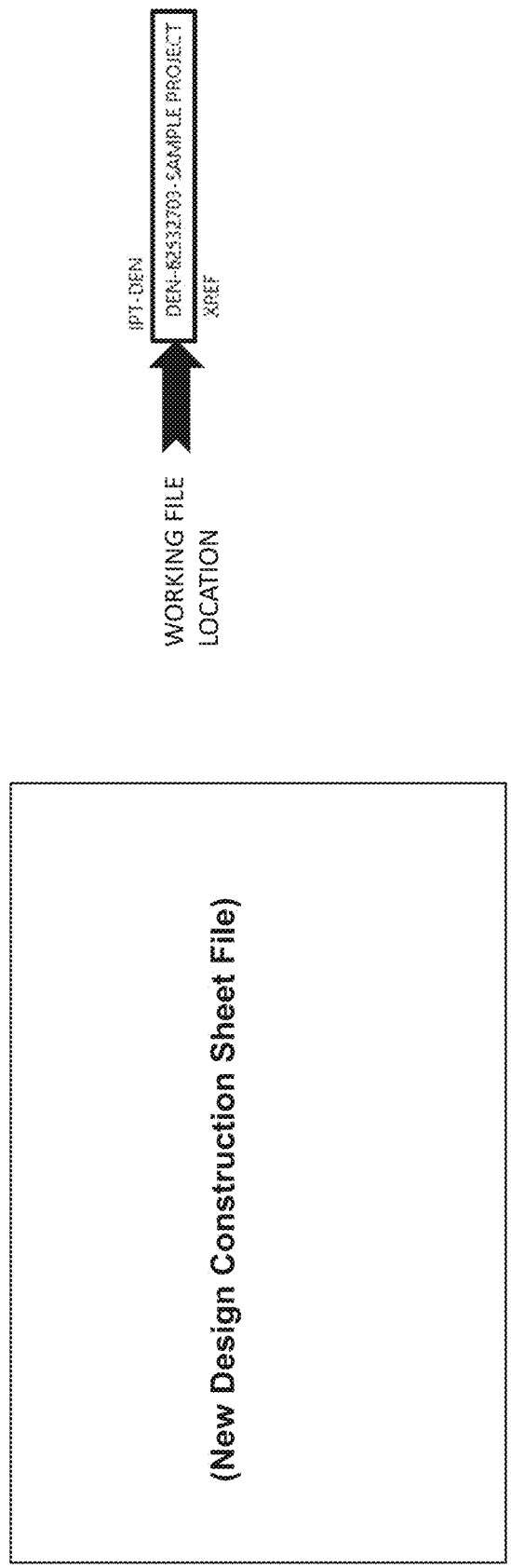

FIG. 8 shows a detailed screenshot view of performing a Step 6—creating a new Design Construction Sheet File by creating a new file and importing the paper space layout of the new Demolition Construction Sheet File and saving the file with the naming conventions that matches the Record Drawing File Name and with a new Unique Project Identifier suffix without any additional designator suffix to distinguish that this document is for design purposes, which allows a user to discern that addition edits in the O&M Record Drawing File Conformance Process are required and also prevent overwrite of data by concurrent changes occurring to the same Record Drawing File (2D, 3D model or Digital Twin File).

Externally referencing (XREF) into the model space of the new Design Construction Sheet File, the new Demolition Construction Sheet File. (using the overlay method) making sure that the origins of both CADD drawing files are in the same location. FREEZE or Turn OFF the DEMOLITION layer and the CORRECTIVES layer. This file will be plotted and distributed for construction activities.

In an embodiment, this file is saved in a separate directory designated for Project Files used for file compositions in the new Demolition and Design Construction Sheet Files. In an embodiment, all other layers in the externally referenced new Demolition Construction Sheet File are grayscaled, and all new items to be added during the construction project are placed on the appropriate discipline specific layers. Note: All layer names used in the Record, new Demolition Construction Sheet File, and the new Design Construction Sheet File should be exactly the same in naming convention with the entity properties set to by-layer. This removes the need for additional manual manipulation of data during the Record Conformance Process of the Brownfield Asset, in an embodiment.

Figure 9:
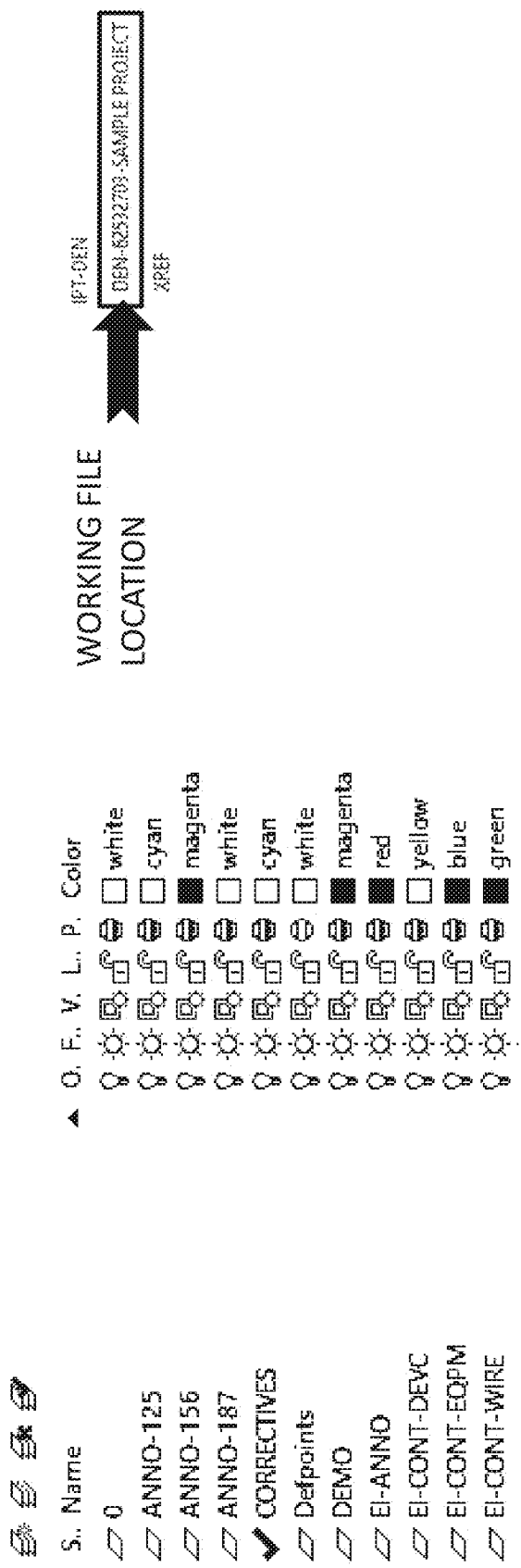

FIG. 9 shows a detailed screenshot view of performing a Step 7—creating a layer named CORRECTIVES (if required) in the new Demolition Construction Sheet File.

Figure 10:
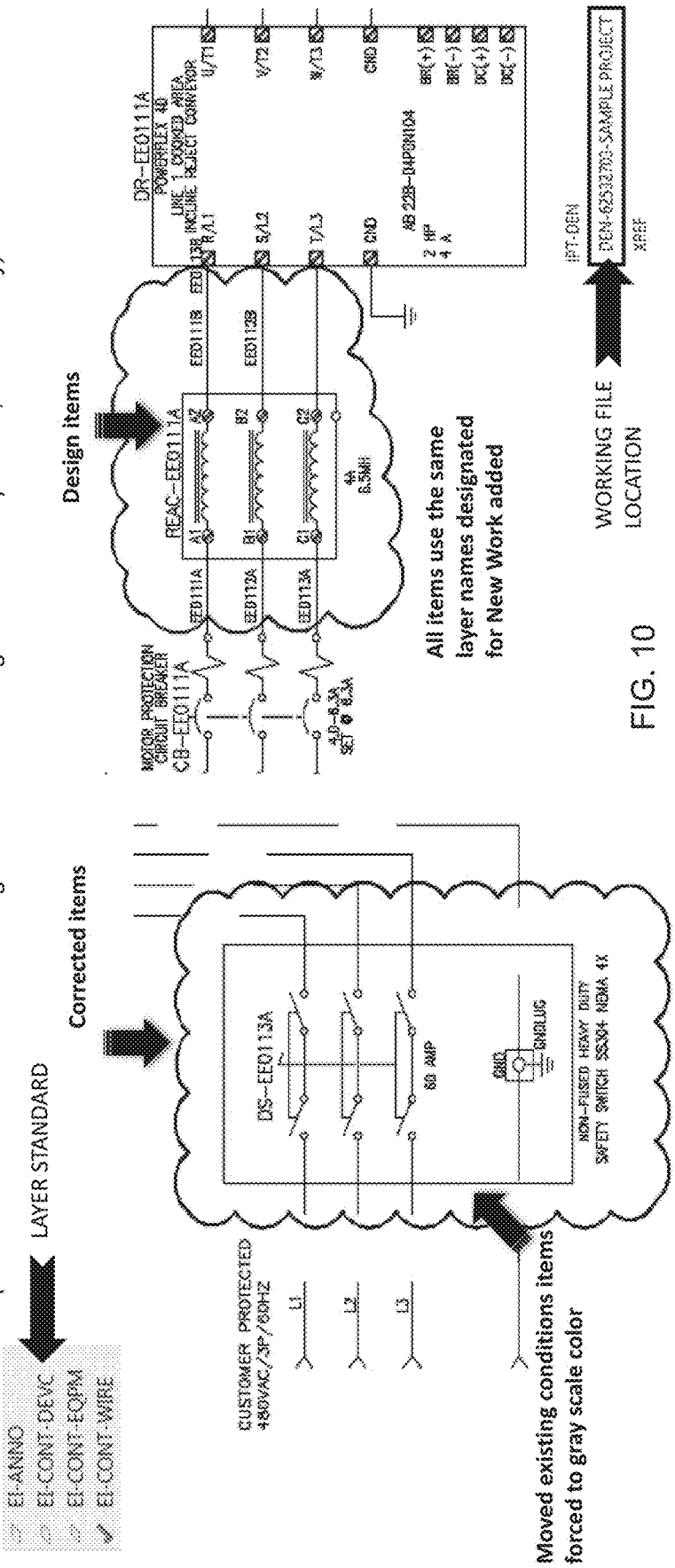

FIG. 10 shows a detailed screenshot view of performing a Step 7a—Alternative Workflow For Correcting Existing Items. In the new Demolition Construction Sheet File, select the items to be corrected—(existing condition items that need to be moved to a new location in the drawing) and perform the following functions.

COPYBASE 0,0 (items to be moved) from the new Demolition Construction Sheet File into the new Design Construction Sheet File (retaining the existing new Demolition Construction Sheet File Layers).

In the new Design Construction Sheet File force, the colors of the items copied from the new Demolition Construction Sheet File to grayscale and move the entities to the desired corrective location.

Figure 11:
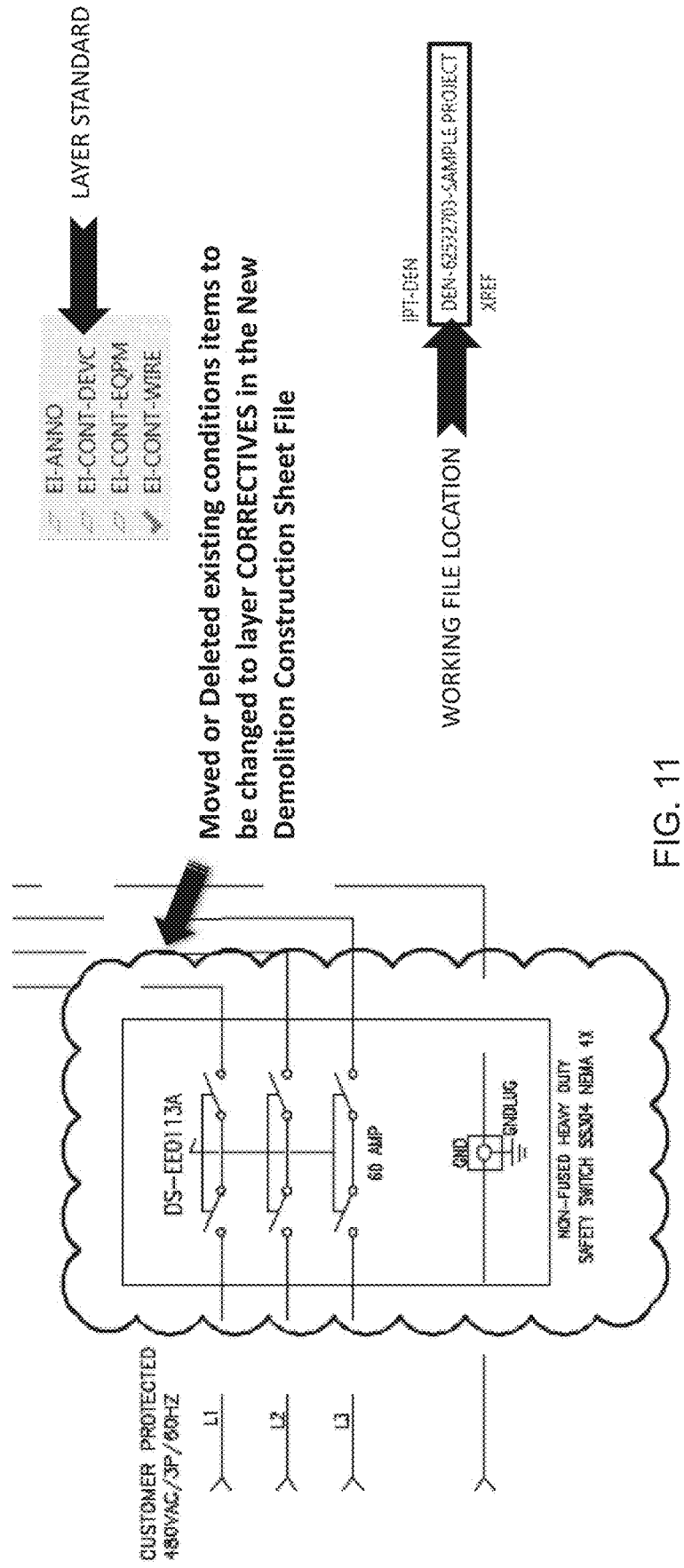

FIG. 11 shows a detailed screenshot view of performing a Step 7b—Alternative Workflow For Moving or Deleting Existing Items. Change Objects from the new Demolition Construction Sheet File that have been selected to meet the following criteria; (Objects do not exist in the field, or objects are being corrected in the new Design Construction Sheet File to show current location in the field), to the CORRECTIVES layer (if required). It should be noted that the CORRECTIVES layer will be ON in the new Demolition Construction Sheet File (see Step 8) unless the CORRECTIVES Layer will be used for removal of existing conditions that do not exist in the field. If this is the case the CORRECTIVES Layer will be FROZEN in the new Demolition Construction Sheet File (see Step 8). The CORRECTIVES Layer in the new Demolition Construction Sheet File will also be FROZEN in the new Design Construction Sheet File (see Step 9).

Figure 12:
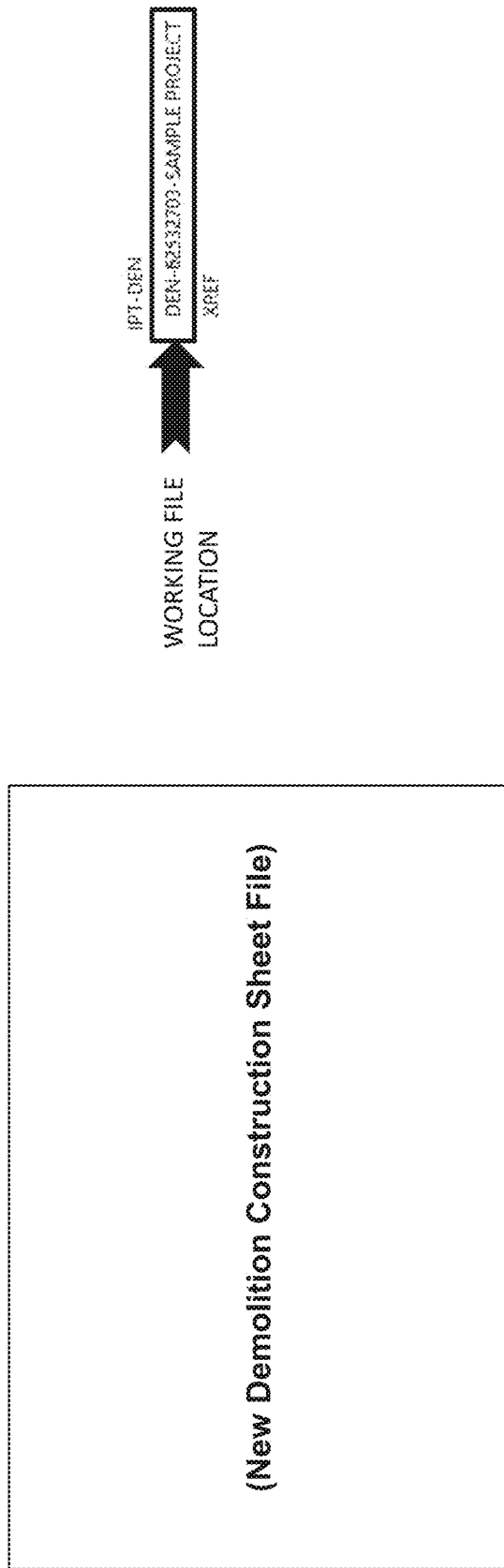

FIG. 12 shows a detailed screenshot view of performing a Step 8—In the new Demolition Construction Sheet File, grayscale all layers except the DEMOLITION layer and FREEZE the CORRECTIVES layer (if it is being used to remove an existing condition). Place all key notes/demolition notes, revision clouds and call out leaders on the appropriate layers in paper space.

Figure 13:
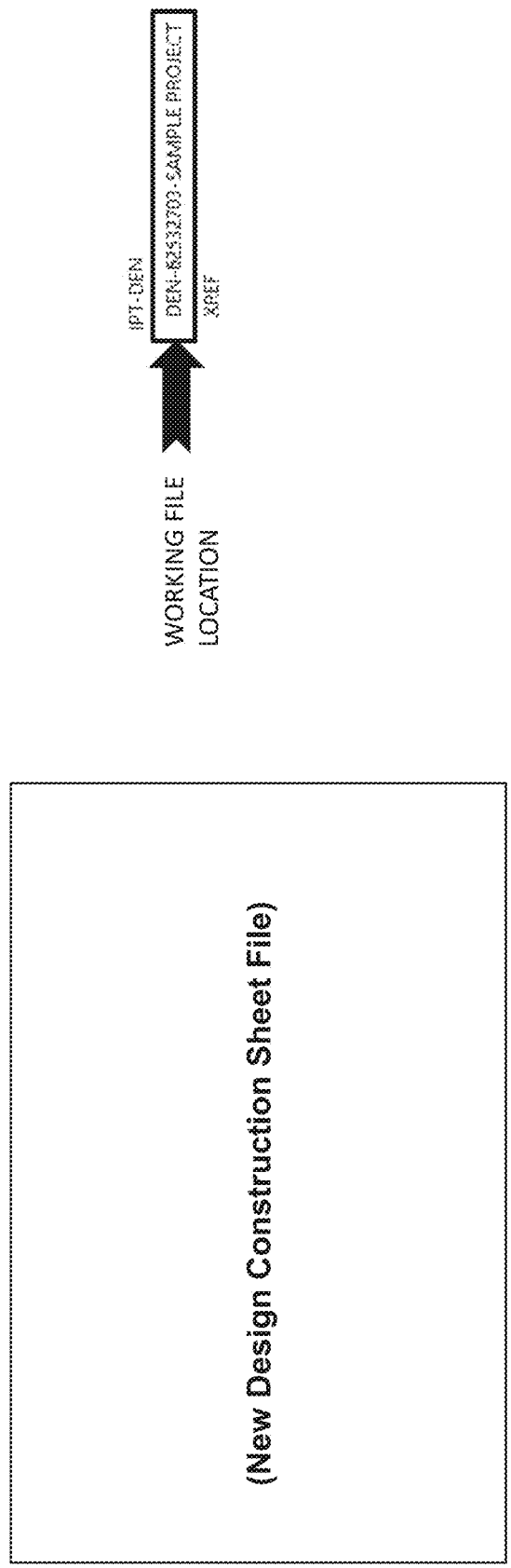

FIG. 13 shows a detailed screenshot view of performing a Step 9—In the new Design Construction Sheet File grayscale all the existing condition layers found in the new Demolition Construction sheet File that is externally referenced into model space, Place all new design on the appropriate corresponding layers that match identical layer names of the new Demolition Construction Sheet File. These layers will designate new work added to the file. Place all key notes/construction notes, revision clouds and call out leaders on the appropriate layers in paper space.

FIG. 14 shows a detailed screenshot view of performing a Step 10—Prior to publication for release of the new Demolition Construction Sheet File and the new Design Construction Sheet File, perform the following steps to ensure all information found within the Record Drawing File (2D, 3D model or Digital Twin file) is maintained as the current version within the new Demolition Construction Sheet File. The new Design Construction Sheet file will reflect the latest existing conditions when opened or published after updates have occurred. Update all Revision Blocks for release. downloading or copying a Record Drawing File (2D, 3D model or Digital Twin file) from Remote Database, DMS, CCS, or File Repository to a working location; deleting all layers in model space of the new Demolition Construction File with exception of the Demolition layer and Correctives layer and with the use of Artificial Intelligence and Machine Learning or Database Comparison Tools to perform spatial analysis of the Record Drawing File (2D, 3D model or Digital Twin file) to import all layers found in model space into the new Demolition Construction Sheet File. Using Artificial Intelligence and Machine Learning or Database Comparison Tools to spatially locate and validate duplicated items that will be delete, comparing between the imported content of the Record Drawing File and the Demolition layer and Correctives layer of the New Demolition File, then removing these duplicated items that were imported from the Record Drawing File within the new Demolition Construction Sheet File while retaining all objects found on the Demolition layer and the Correctives layer within the new Demolition Construction Sheet File.

Check and resolve any design conflicts. Save the file.

Figure 15:
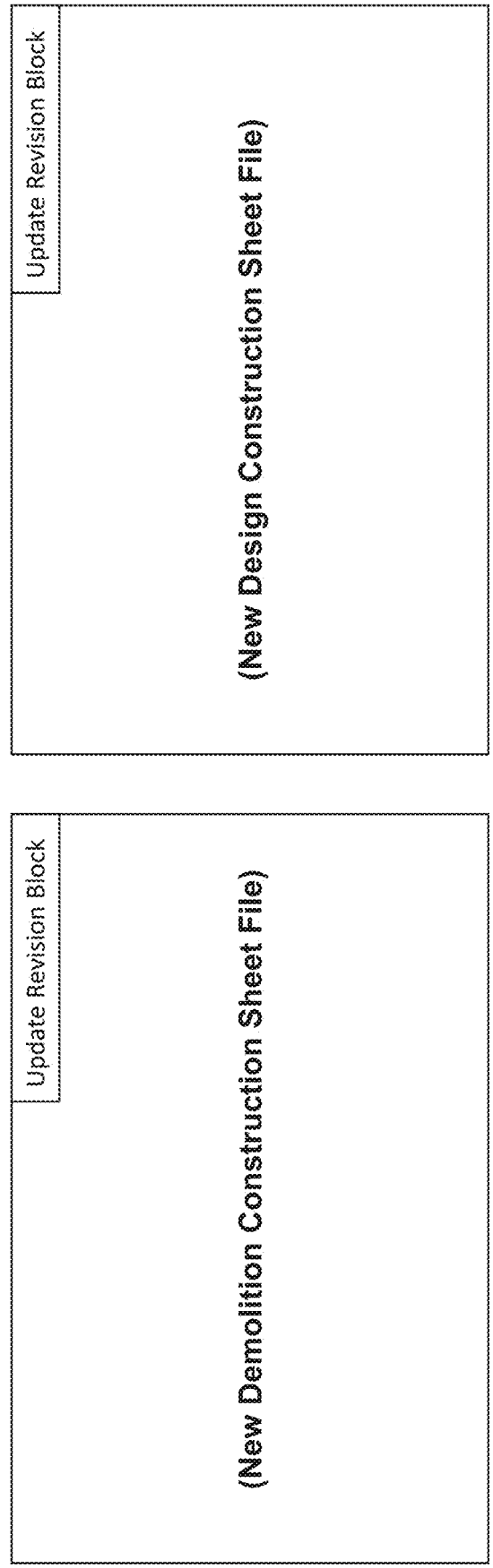

FIG. 15 shows a detailed screenshot view of performing of a Step 10. Update Revision Blocks in new Demolition Construction Sheet File and new Design Construction Sheet File and save the files. Upon approval publish both the new Demolition Construction Sheet File and the new Design Construction Sheet File for release for construction.

Figure 16:
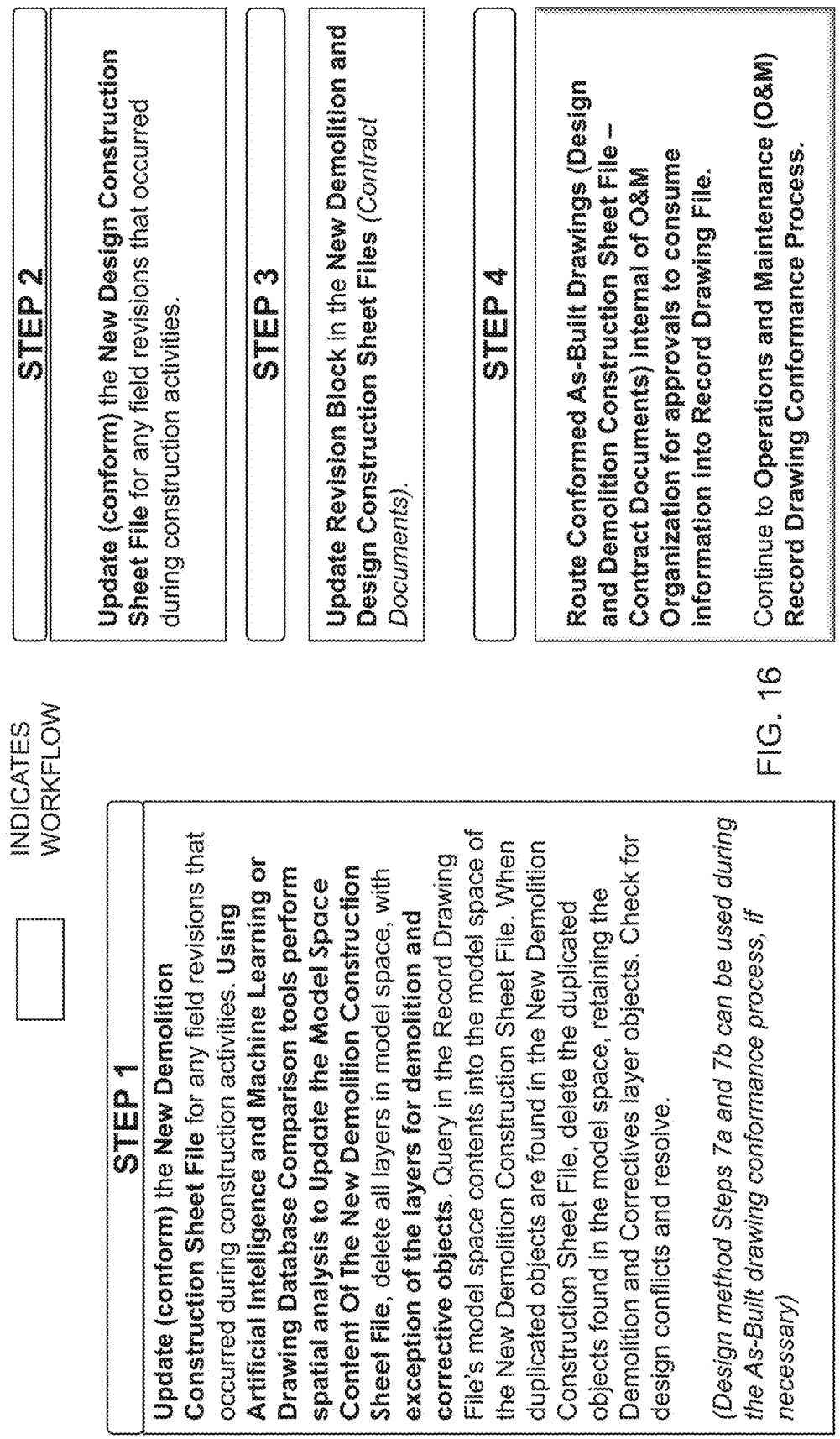
FIG. 16 is a flowchart showing an exemplary Operations and Maintenance As-Built Drawing Conformance Process, in an aspect.

FIG. 16 is a flowchart showing an exemplary O&M As-Built Drawing Conformance Process for protecting the integrity of dynamically modified files, in an aspect. Exemplary actions taken are described in more detail with respect to FIGS. 17-19, below.

Figure 17:
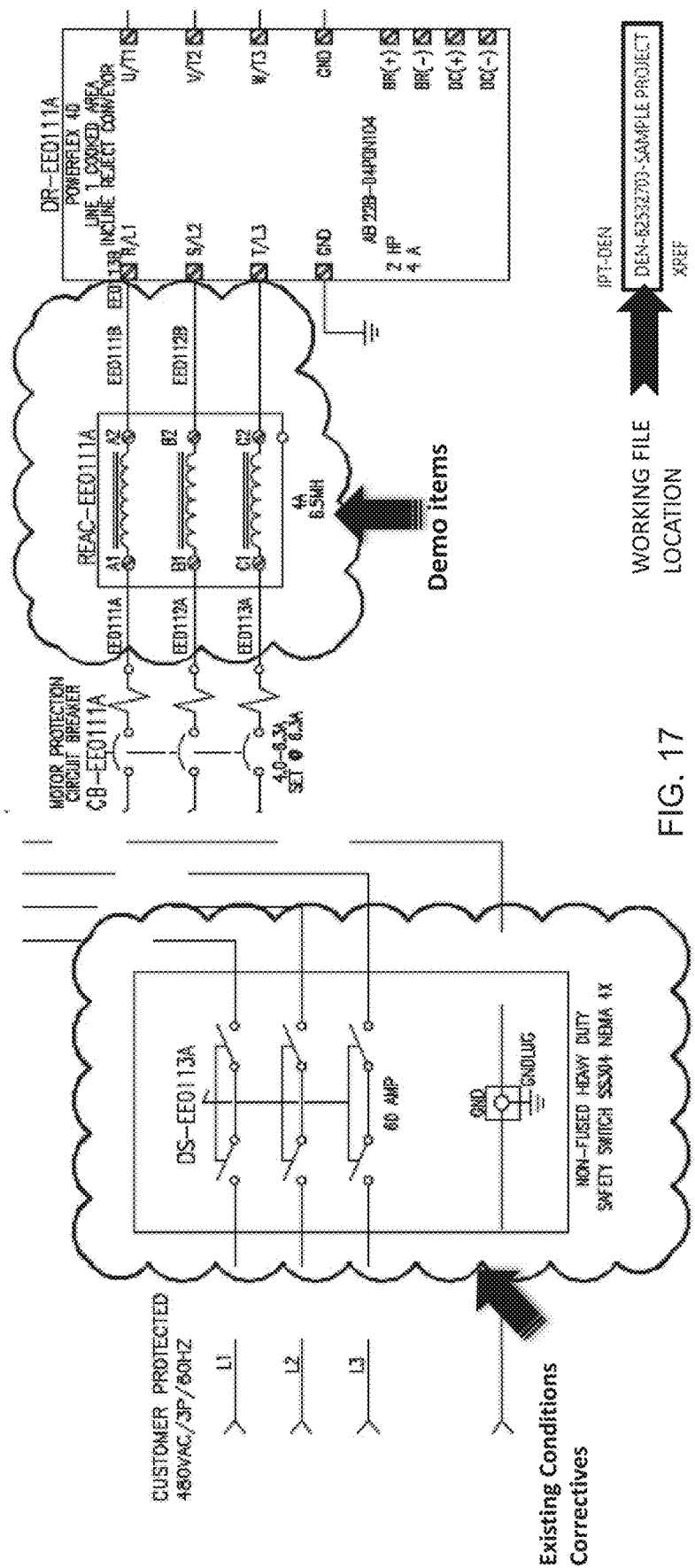
FIGS. 17-19 show exemplary actions performable with an Operations and Maintenance As-Built Drawing Conformance Process, in an aspect.

FIG. 17 shows a detailed screenshot view of performing a Step 1—Update (conform) the new Demolition Construction Sheet File. Make necessary revisions to the new Demolition Construction Sheet File if necessary for any field revisions that occurred during construction activities. Perform the following steps to ensure all information found within the Record Drawing File (2D, 3D model or Digital Twin file) is maintained as the current version within the new Demolition Construction Sheet File. The new Design Construction Sheet file will reflect the latest existing conditions when opened or published after updates have occurred.

Downloading or copying a Record Drawing File (2D, 3D model or Digital Twin file) from a Remote Database, DMS, CCS, or File Repository to a working location; deleting all layers in model space of the new Demolition Construction Sheet File with exception of the Demolition layer and Correctives layer and performing spatial analysis of the Record Drawing File (2D, 3D model or Digital Twin file) with the use of Artificial Intelligence and Machine Learning or Database Comparison Tools to import all layers found in the model space of the Record Drawing File into the model space of the new Demolition Construction Sheet File; Using Artificial Intelligence and Machine Learning or Database Comparison Tools to spatially locate and validate duplicated items that will be deleted, comparing between the imported content of the Record Drawing File and the Demolition layer and Correctives layer of the New Demolition File, then removing these duplicated items that were imported from the Record Drawing File within the new Demolition Construction Sheet File while retaining all objects found on the Demolition layer and the Correctives layer within the new Demolition Construction Sheet File; conforming the new Design Construction Sheet File for As-built including making revisions to the new Design Construction Sheet File in both model space and paper space, if necessary, for any field revisions that occurred during construction activities; updating the Revision Block in the new Demolition Construction Sheet File and updating the Revision Block in the new Design Construction Sheet File; and, routing conformed As-Built drawings, comprising the new Demolition Construction Sheet File and new Design Construction Sheet File, for approval to apply the changes to the latest historical Record Drawing File (2D, 3D model or Digital Twin file). Check for design conflicts and resolve. Design methods 7a and 7b can be used during the As-built Drawing Conformance process, if necessary.

Figure 18:
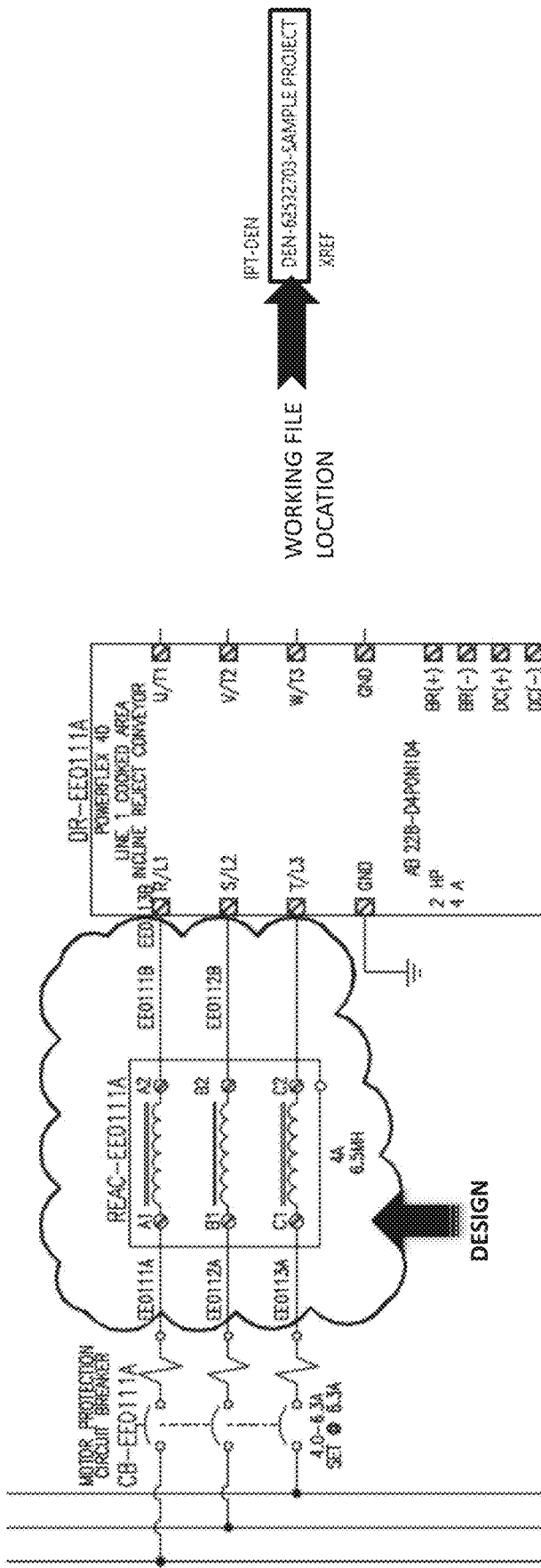

FIG. 18 shows a detailed screenshot view of performing a Step 2—Update (conform) the new Design Construction Contract Sheet File. Make necessary revisions to the new Design Construction Contract Sheet File if necessary for any field revisions that occurred during construction activities. (Design methods 7a and 7b can be used during the As-built Drawing Conformance process, if necessary)

Figure 19:
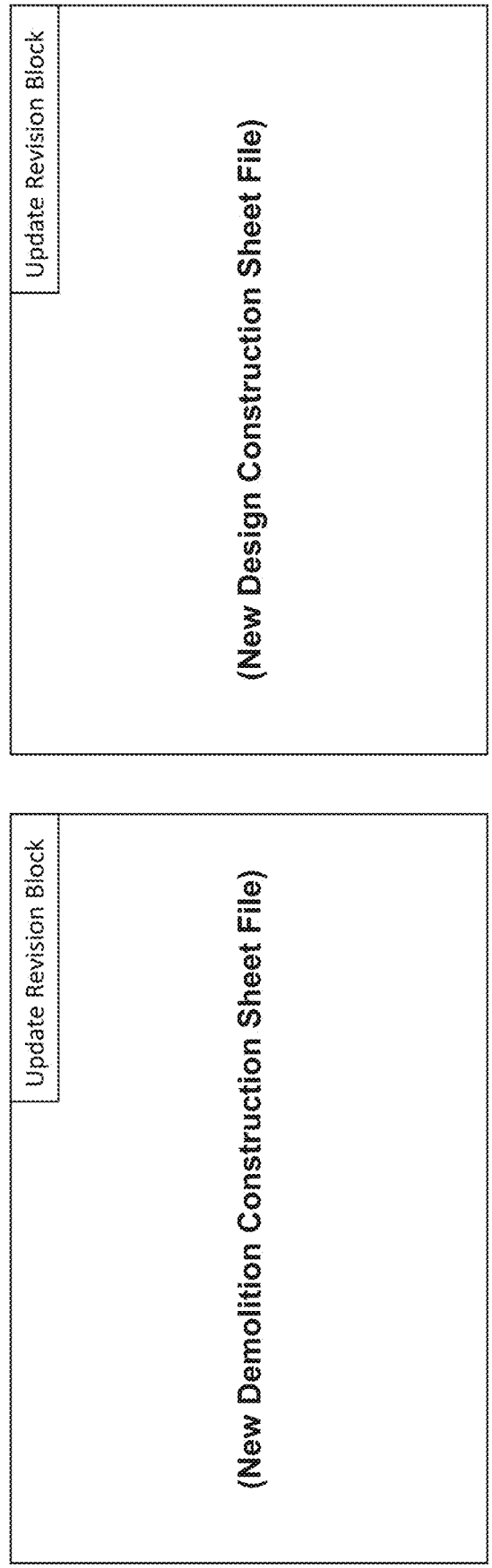

FIG. 19 shows a detailed screenshot view of performing a Steps 3 and 4—Update Revision Block in the new Demolition Construction Sheet File and the new Design Construction Sheet File. Update Revision Block in the new Demolition Contract Sheet File and the new Design Construction Sheet File. Publish and route the Conformed As-Built Documents for Approval. Upon approval, continue to the O&M Record Drawing Conformance Process.

Figure 20:
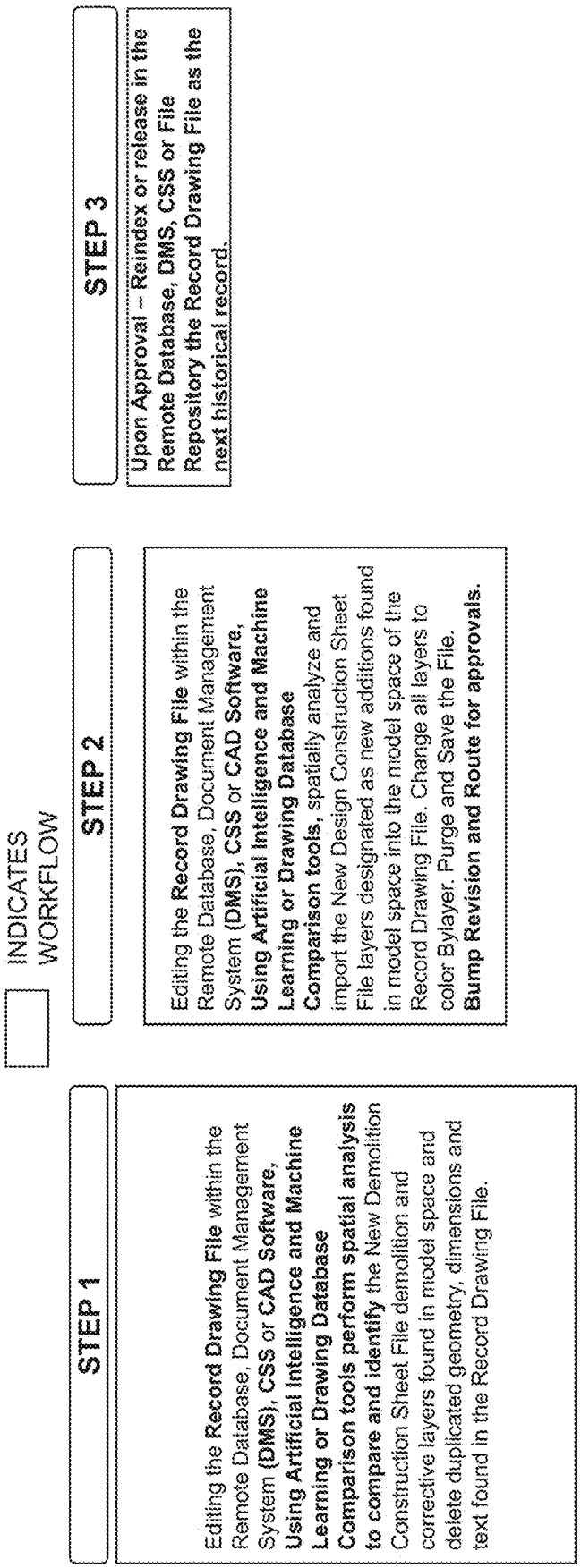
FIG. 20 is a flowchart showing an exemplary Operations and Maintenance Record Drawing Conformance Process, in an aspect.

FIG. 20 is a flowchart showing an exemplary O&M Record Drawing Conformance Process for protecting the integrity of dynamically modified files for Brownfield Assets, in an aspect. Exemplary actions taken are described in more detail with respect to FIGS. 21-23, below.

Figure 21:
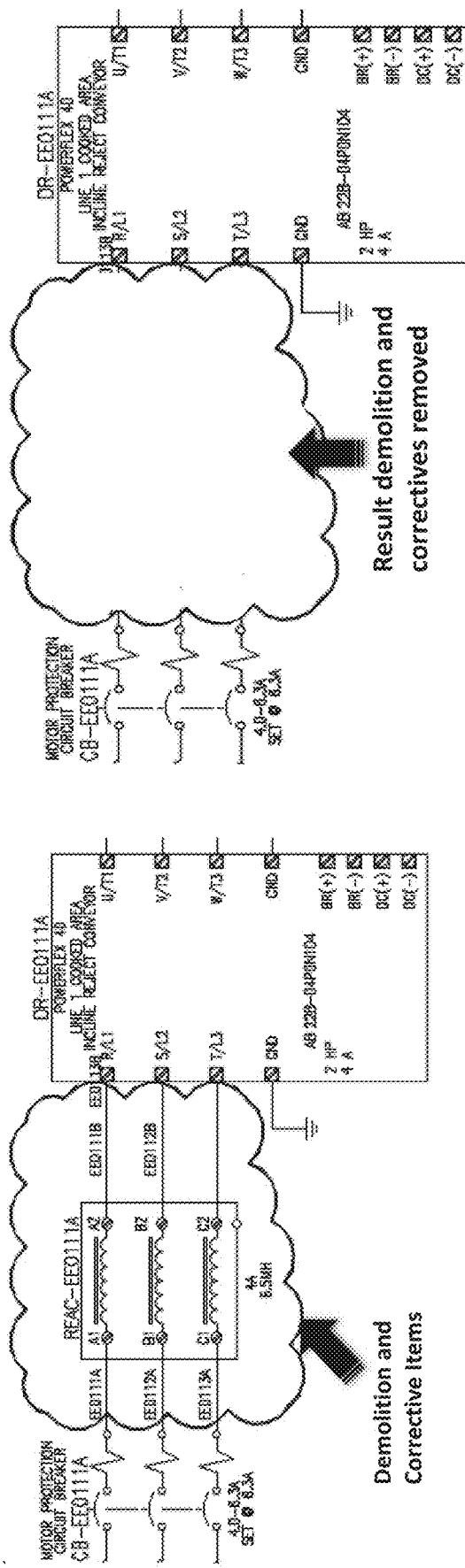
FIGS. 21-23 show exemplary actions performable with an Operations and Maintenance Record Drawing Conformance Process, in an aspect.

FIG. 21 shows a detailed screenshot view of performing a Step 1—Editing the Record Drawing File (2D, 3D model or Digital Twin file) within a Remote Database, Document Management System, Cloud Computing Service, CAD software or File Repository, download to the working location.

Step 1—Using Artificial Intelligence and Machine Learning or Database Comparison Tools to perform spatial analysis to compare, identify and perform a deletion of duplicated geometry, dimensions and text to remove from the Record Drawing File (2D, 3D model or Digital Twin file) objects that are duplicated on the Demolition layer and Correctives layer found within the new Demolition Construction Sheet File.

Figure 22:
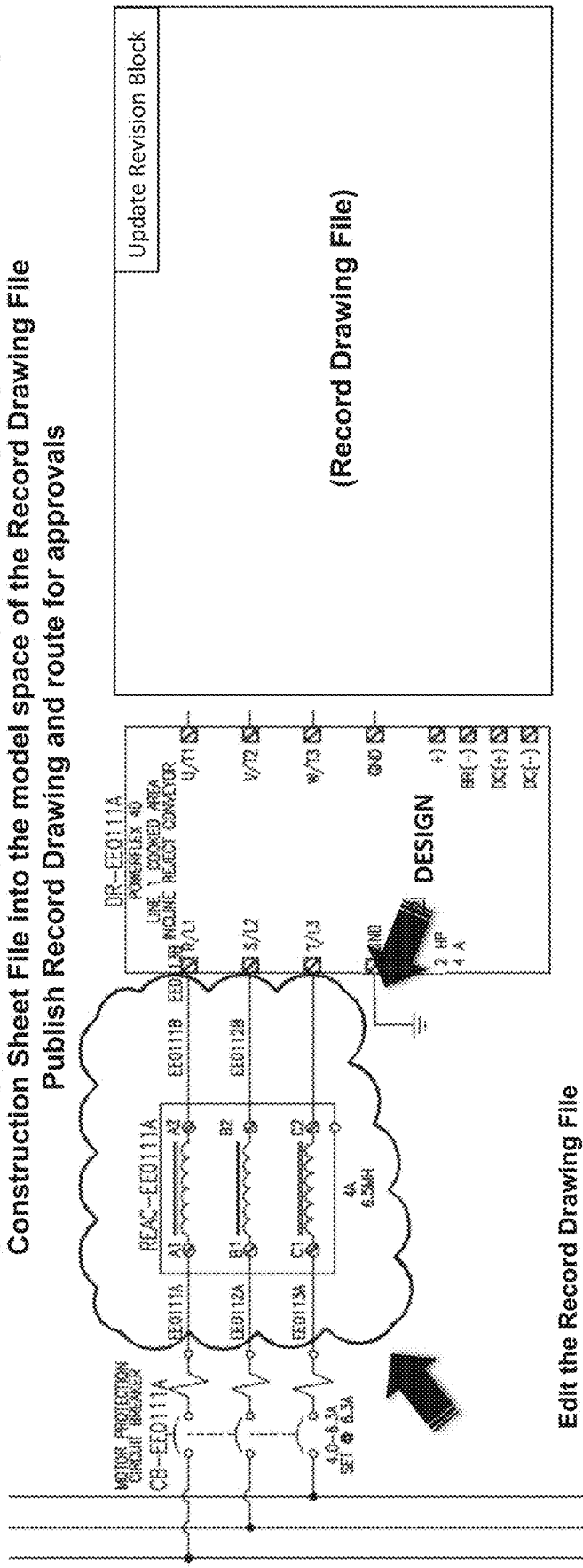

FIG. 22 shows a detailed screenshot view of performing a Step 2 as outlined below.

Using Artificial Intelligence and Machine Learning or Database Comparison Tools to perform spatial analysis by querying all the new Design Construction Sheet File layers found in model space into the model space of the Record Drawing File (2D, 3D model or Digital Twin file) and adjust all entity colors to BYLAYER.

Update revision block+1 revision—RECORD Description per O&M CADD Standards. PURGE and SAVE the file. Publish Record Drawing and route for final approvals.

Figure 23:
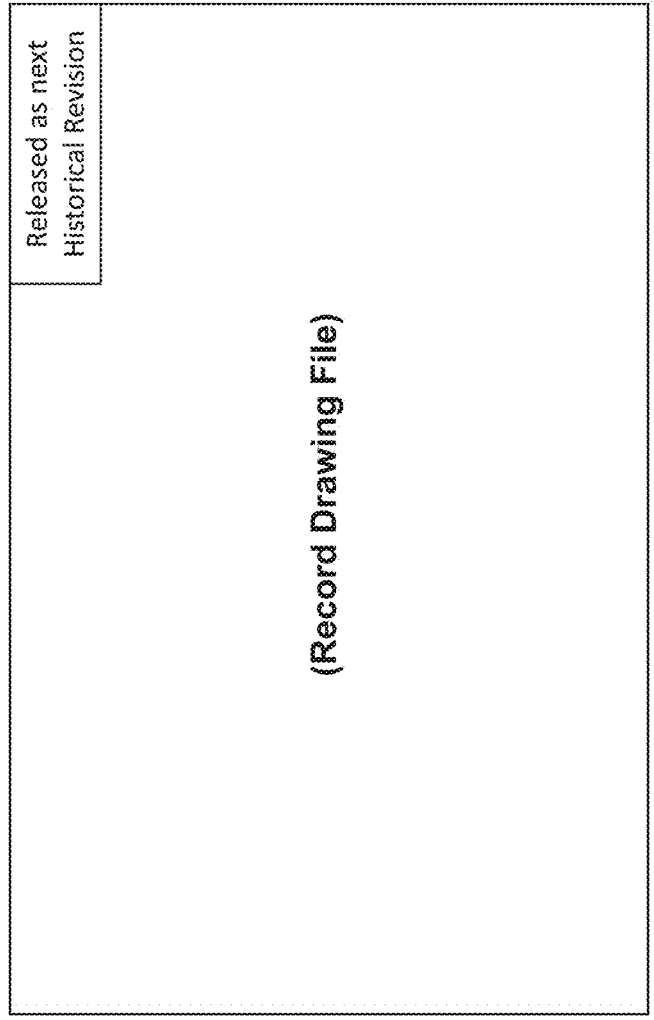

FIG. 23 shows a detailed screenshot view of performing a Step 3 as outlined below.

Upon approval—Reindex or release in the Remote Database, DMS, CCS, or File Repository the Record Drawing File (2D, 3D model or Digital Twin file) for release as the next historical record.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Further, described ranges are intended to include numbers outside any range described within statistical error and/or inherent measurement equipment limitations.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An operations and maintenance enhanced design drawing conformance process for protecting the integrity of dynamically modified files, comprising:

downloading or copying a Record Drawing File (2D, 3D model or Digital Twin file) from a Remote Database, Document Management System (DMS), Cloud Computing Service (CCS), or File Repository;

conforming the Record Drawing File (2D, 3D model or Digital Twin file) for CADD standards for proper model space and paper space usage;

reindexing the conformed Record Drawing File (updated 2D, 3D model or Digital Twin file) into the Remote Database, DMS, CCS, or File Repository;

renaming the conformed downloaded or copied Record Drawing File (updated 2D, 3D model or Digital Twin file) matching a name of the Record Drawing File and with a Unique Project Identifier suffix with an additional designator suffix to distinguish that this document is for demolition purposes, known as a new Demolition Construction Sheet File, which allows a user to discern that removal edits to an existing Record Drawing File (2D, 3D model or Digital Twin file) is required and which also prevents overwrite of data by concurrent changes occurring to the same Record Drawing File;

creating a Demolition Layer that includes demolition objects to be removed in the new Demolition Construction Sheet File;

creating a Correctives layer that includes existing conditions that require drawing correctives for content or location in the new Demolition Construction Sheet File;

changing demolition objects to the Demolition Layer within the new Demolition Construction Sheet File, this file will be plotted and distributed for construction activities;

creating a new Design Construction Sheet File by importing a paper space layout of the new Demolition Construction Sheet File and saving the new Design Construction Sheet File with naming conventions that match the Record Drawing File Name and with a new Unique Project Identifier suffix without any additional designator suffix to distinguish that this document is for design purposes, which allows a user to discern that addition edits to an existing Record Drawing File (2D, 3D model or Digital Twin file) is required and which also prevents overwrite of data by concurrent changes occurring to the same Record Drawing File (2D, 3D model or Digital Twin file); and, externally referencing (XREF) into a model space of the new Design Construction Sheet File, the new Demolition Construction Sheet File, freezing the Demolition layer and Correctives layer of the externally referenced new Demolition Construction Sheet File, this file will be plotted and distributed for construction activities.

2. The process according to claim 1, wherein downloading is from a Remote Database, DMS, CCS, or File Repository.

3. The process according to claim 1, wherein conforming includes validating and applying Layer standards, validating Borders as externally referenced entities, inserting Border Informational Text into a paper space layout to allow for variable information to be managed and maintained, allowing for mapped values (meta data) into the Remote Database, DMS, CCS, or File Repository, and moving historical text, dimensions and notes found in paper space into model space to their correct spatial locations and applying an appropriate scale factor to this information to ensure legibility and that all historical data can be correctly used within the process.

4. The process according to claim 1, wherein conforming includes re-indexing the conformed Record Drawing File (updated 2D, 3D model or Digital Twin file) into the Remote Database, DMS or CCS, or File Repository prior to the creation of the new Demolition Construction Sheet File to ensure that all drawing historical data, now in model space, is saved, available and can be correctly used within the process.

5. The process according to claim 1, wherein renaming matching the Record Drawing File Name and with a Unique Project Identifier suffix with an additional designator suffix to distinguish that this document is for demolition purposes, known as the new Demolition Construction Sheet File which allows a user to discern that removal edits to an existing Record Drawing File (2D, 3D model or Digital Twin file) is required, while also preventing overwrite of data by concurrent changes occurring to other copies of the same Record Drawing File (2D, 3D model or Digital Twin file) by other files with another Unique Project Identifier Number suffix.

6. The process according to claim 5, further comprising saving the new Demolition Construction Sheet File in a separate directory designated for Project Files used for file compositions in the new Demolition Construction Sheet File and new Design Construction Sheet File.

7. The process according to claim 1, further comprising making sure that the origins of both the Record Drawing File (2D, 3D model or Digital Twin file) and the new Demolition Construction Sheet File are in the same location spatially and using the overlay method externally referencing in the new Demolition Construction Sheet File into the model space of the new Design Construction Sheet File.

8. The process according to claim 1, wherein creating the new Design Construction Sheet File further comprises freezing the Demolition layer and Correctives layer.

9. The process according to claim 1, wherein creating the new Design Construction Sheet File further comprises saving the new Design Construction Sheet File in a separate directory designated for Project Files.

10. The process according to claim 1, wherein creating the new Design Construction Sheet File further comprises placing all new items to be added during the construction project on the appropriate discipline specific layers, wherein all layer names used in the Record Drawing File (2D, 3D model or Digital Twin file), new Demolition Construction Sheet File, and the new Design Construction Sheet File should be exactly the same in naming convention with the entity properties set to by layer.

11. The process according to claim 1, further comprising creating a Correctives layer CORRECTIVES in the new Demolition Construction Sheet File.

12. The process according to claim 11, further comprising correcting items in the new Demolition Construction Sheet File and copying them to the new Design Construction Sheet File in model space, preserving the layers they reside on within the new Demolition Construction Sheet File, placing these objects in the desired location and setting the colors to grayscale on the objects within the new Design Construction Sheet File, then changing those objects to the Correctives layer within the new Demolition Construction Sheet File.

13. The process according to claim 11, further comprising deleting items in the new Demolition Construction Sheet File.

14. The process according to claim 1, wherein creating the new Demolition Construction Sheet File includes freezing the Correctives layer if it is being used to remove an existing condition and placing notes and call out leaders on the appropriate layers in paper space.

15. The process according to claim 1, wherein creating the new Design Construction Sheet File includes freezing the Demolition layer and Correctives layer.

16. The process according to claim 1, wherein creating the new Design Construction Sheet File includes externally referencing the new Demolition Construction Sheet File into the model space of the new Design Construction Sheet File and placing notes and call out leaders on the appropriate layers in paper space, for incorporation into the Record Drawing File (2D, 3D model or Digital Twin file).

17. The process according to claim 1, wherein colors are used to differentiate at least one of the layers, files, and operations to be performed.

18. The process according to claim 1, further comprising:
   conforming the new Demolition Construction Sheet File for As-built including making revisions to the new Demolition Construction Sheet File in both model space and paper space for any field revisions that occurred during construction activities;
downloading or copying a Record Drawing File (2D, 3D model or Digital Twin file) from a Remote Database, DMS, CCS, or File Repository to a working location; deleting all layers in model space of the new Demolition Construction Sheet File with exception of the Demolition layer and Correctives layer and performing spatial analysis of the Record Drawing File (2D, 3D model or Digital Twin file) with the use of Artificial Intelligence and Machine Learning or Database Comparison Tools to import all layers found in the model space of the Record Drawing File into the model space of the new Demolition Construction Sheet File;
   using Artificial Intelligence and Machine Learning or Database Comparison Tools to spatially locate and validate duplicated items that will be deleted, comparing between the imported content of the Record Drawing File and the Demolition layer and Correctives layer of the New Demolition File, then removing these duplicated items that were imported from the Record Drawing File within the new Demolition Construction Sheet File while retaining all objects found on the Demolition layer and the Correctives layer within the new Demolition Construction Sheet File;
   conforming the new Design Construction Sheet File for As-built including making revisions to the new Design Construction Sheet File in both model space and paper space, if necessary, for any field revisions that occurred during construction activities;
   updating the Revision Block in the new Demolition Construction Sheet File and updating the Revision Block in the new Design Construction Sheet File; and,
   routing conformed As-Built drawings, comprising the new Demolition Construction Sheet File and new Design Construction Sheet File, for approval to apply the changes to the latest historical Record Drawing File (2D, 3D model or Digital Twin file).

19. The process according to claim 1, further comprising: prior to publication for release of the new Demolition Construction Sheet File and the new Design Construction Sheet File, performing the following steps to ensure all information found within the Record Drawing File (2D, 3D model or Digital Twin file) is maintained as the current version within the new Demolition Construction Sheet File, where the new Design Construction Sheet file will reflect the latest existing conditions when opened or published after updates have occurred,
updating all Revision Blocks for release, downloading or copying a Record Drawing File (2D, 3D model or Digital Twin file) from Remote Database, DMS, CCS, or File Repository to a working location,
deleting all layers in model space of the new Demolition Construction File with exception of the Demolition layer and Correctives layer and with the use of Artificial Intelligence and Machine Learning or Database Comparison Tools to perform spatial analysis of the Record Drawing File (2D, 3D model or Digital Twin file) to import all layers found in model space into the new Demolition Construction Sheet File,
using Artificial Intelligence and Machine Learning or Database Comparison Tools to spatially locate and validate duplicated items that will be deleted, comparing between the imported content of the Record Drawing File and the Demolition layer and Correctives layer of the New Demolition File, then removing these duplicated items that were imported from the Record Drawing File within the new Demolition Construction Sheet File while retaining all objects found on the Demolition layer and the Correctives layer within the new Demolition Construction Sheet File,
checking and resolving any design conflicts, and,
saving the new Demolition Construction Sheet File.

20. The process according to claim 1, further comprising:
downloading or copying a Record Drawing File (2D, 3D model or Digital Twin file) from a Remote Database, DMS, CCS, CAD Software, or File Repository to a working location;
using Artificial Intelligence and Machine Learning or Database Comparison Tools to perform spatial analysis to compare, identify and perform a deletion of duplicated geometry, dimensions and text to remove from the Record Drawing File (2D, 3D model or Digital Twin file) objects that are duplicated on the Demolition layer and Correctives layer found within the new Demolition Construction Sheet File,
using Artificial Intelligence and Machine Learning or Database Comparison Tools to perform spatial analysis to query the new Design Construction Sheet File and import all new Design Construction Sheet File layers found in model space into the Record Drawing File (2D, 3D model or Digital Twin file) and adjust all entity colors to BYLAYER; and,
plotting Record Drawing File (2D, 3D model or Digital Twin file) and routing the plotted Record Drawing File (2D, 3D model or Digital Twin file) for approval prior to indexing the Record Drawing File (2D, 3D model or Digital Twin file) into the Remote Database, DMS, CCS, CAD Software, or File Repository.

* * * * *